United States Patent
Zimmel et al.

(10) Patent No.: US 6,660,376 B1
(45) Date of Patent: Dec. 9, 2003

(54) METHOD OF BONDING PERMEABLE SUBSTRATES WITH HOT MELT MOISTURE CURE ADHESIVE HAVING LOW VISCOSITY AND HIGH GREEN STRENGTH

(75) Inventors: John M. Zimmel, St. Paul, MN (US); William L. Bunnelle, Ham Lake, MN (US); Brendon J. Kryzer, White Bear Lake, MN (US)

(73) Assignee: H. B. Fuller Licensing & Financing Inc., St. Paul, MN (US)

( * ) Notice: Subject to any disclaimer, the term of this patent is extended or adjusted under 35 U.S.C. 154(b) by 205 days.

(21) Appl. No.: 09/588,772

(22) Filed: Jun. 6, 2000

(51) Int. Cl.⁷ ............ B32B 15/04; B32B 7/12
(52) U.S. Cl. .............. 428/355 N; 428/304.4; 428/317.1; 428/317.3; 428/317.7; 428/319.3; 428/346; 528/48; 528/52; 528/53; 528/67; 528/219; 528/368; 525/452; 525/453; 525/457; 525/458
(58) Field of Search ............. 528/48, 52, 53, 528/67, 219, 368; 525/452, 453, 457, 458; 428/304.4, 317.1, 317.3, 317.5, 317.7, 318.4, 319.3, 343, 346, 347, 349, 355 N

(56) References Cited

U.S. PATENT DOCUMENTS

| | | | |
|---|---|---|---|
| 3,043,807 A | * | 7/1962 | Snyder et al. .......... 525/28 |
| 4,585,819 A | | 4/1986 | Reischle et al. |
| 4,808,255 A | * | 2/1989 | Markevka et al. ..... 156/307.3 |
| 4,889,915 A | * | 12/1989 | Brauer et al. ........... 524/590 |
| 4,985,535 A | | 1/1991 | Takada et al. |
| 5,036,143 A | | 7/1991 | Brauer et al. |
| 5,155,180 A | | 10/1992 | Takada et al. |
| 5,441,808 A | * | 8/1995 | Anderson et al. ....... 428/349 |
| 5,869,593 A | * | 2/1999 | Helmeke et al. ........ 428/334 |
| 5,994,493 A | | 11/1999 | Krebs |
| 6,133,400 A | * | 10/2000 | Helmeke ................. 428/334 |

FOREIGN PATENT DOCUMENTS

| | | |
|---|---|---|
| EP | 0 827 995 A2 | 3/1998 |
| WO | WO 99/32535 | 7/1999 |

OTHER PUBLICATIONS

Technical Data Sheet for ESTANE polymers, taken from www.estane.com on Jun. 5, 2002.*
ESTANE Product Portfolio, Noveon, 08/99.*

* cited by examiner

Primary Examiner—James J. Seidleck
Assistant Examiner—Travis B Ribar

(57) ABSTRACT

The present invention relates to a hot melt moisture cure adhesive composition well suited for bonding porous substrates such as fabric, methods of adhesively bonding substrates and corresponding articles. The adhesive composition exhibits a combination of flexibility, high green strength, low molten viscosity and high heat resistance. In view of these properties, the adhesive is particularly amendable to hot melt adhesive application techniques wherein small individual discrete deposits of adhesive are applied to a substrate. The adhesive composition prepolymer is preferably the reaction product of at least one polyol, at least one polyisocyanate and at least one high molecular weight thermoplastic polyurethane lacking hard segments.

28 Claims, No Drawings

METHOD OF BONDING PERMEABLE SUBSTRATES WITH HOT MELT MOISTURE CURE ADHESIVE HAVING LOW VISCOSITY AND HIGH GREEN STRENGTH

FIELD OF THE INVENTION

The present invention relates to a hot melt moisture cure adhesive composition well suited for bonding porous substrates such as fabric, methods of adhesively bonding substrates and corresponding articles. The adhesive composition exhibits a combination of flexibility, high green strength, low molten viscosity and high heat resistance. In view of these properties, the adhesive is particularly amendable to hot melt adhesive application techniques wherein small individual discrete deposits of adhesive are applied to a substrate. The adhesive composition prepolymer is preferably the reaction product of at least one polyol, at least one polyisocyanate and at least one high molecular weight thermoplastic polyurethane lacking hard segments.

BACKGROUND OF THE INVENTION

Reischle et al., U.S. Pat. No. 4,585,819 issued Apr. 29, 1986 and DE-A-32 36 313 relate to an adhesive comprising an isocyanate prepolymer, a low molecular weight ketone resins, and optionally a thermoplastic polyurethane or polyester. Exemplified is a thermoplastic polyurethane formed from 404 grams of polyester diol based on adipic acid 1,4 butane diol and ethylene glycol with an OH-number of about 55 and a molecular weight of about 2,000, 20 grams of 1,4-butane diol and 109.5 g of 4,4'-diisocyanatodiphenyl methane. The inclusion of 1,4-butane diol contributes hard segments in the thermoplastic urethane component.

Brauer et al., U.S. Pat. No. 5,036,143 issued Jul. 30, 1991 teaches a high green strength curable urethane adhesive composition of a polyol, an organic isocyanate compound, a thermoplastic polyurethane which is soluble in methyl ethyl ketone, and optionally a solvent for controlling the percent solids and viscosity of the composition. The most preferred TPU is Millathane E-34. Other suitable TPU's are described in U.S. Pat. No. 3,043,807 issued Jul. 10, 1962, incorporated therein by reference. The 100% solids urethane adhesives are prepared from liquid reactants. The compositions are 100% solids in that the compositions do not contain solvents. However, due to the low melting point of the reactants, such compositions are flowable at room temperature. The adhesive compositions have a relatively high green strength for a liquid, per se. However, the compositions have relatively low green strength in comparison to thermoplastic solids wherein the initial green strength is obtained by the increase in modulus obtained by cooling the composition from a liquid state to a solid state. Further, in the case of bonding fabrics, liquid adhesive composition have a tendency to penetrate too far into the fabric resulting in poor bond strengths, undesirable stiffening of the fabric upon subsequent cure of the adhesive, or penetration through the fabric resulting in adhesive build-up on the equipment.

Takada et al., U.S. Pat. No. 5,115,180 issued Oct. 13, 1992 teaches a moisture curing hot melt adhesive comprising a blend of urethane prepolymers. The first urethane prepolymer comprising hard and soft segments as well as other specific properties, whereas the second urethane prepolymer comprises a soft segment moiety and terminal isocyanate group which is prepared in a specific manner. The exemplified adhesive compositions have a relatively high viscosity, greater than $1\times10^6$ cps at 120° C.

More recently, Krebs, U.S. Pat. No. 5,994,493 issued Nov. 30, 1999 stated that, "For formulations which are intended to have high initial strengths and to be applied to porous materials, 5 to 40% by weight of the thermoplastic polyurethane has to be added. Unfortunately, this increases the melt viscosity with the result that these adhesive can only be applied by spraying at very high temperatures." Krebs describes reactive hot melt adhesives having a viscosity of less than about 8000 mPas at 150° C. consisting of a polyurethane prepolymer terminated by reactive isocyante groups which is the reactive product of based on liquid polyether or polyester polyol having certain properties, certain polyol alkoxylation products having a molecular weight below 1000 and at least one diisocyanate.

Although low in viscosity, the compositions of Krebs et al. tend to be stiff and exhibit short open times. Accordingly, industry would find advantage in hot melt moisture curing adhesive compositions having an improved balance of properties, particularly for fabric bonding.

SUMMARY OF THE INVENTION

The applicants have discovered a hot melt moisture cure adhesive composition exhibiting a synergistic combination of low viscosity and high green strength that is particularly useful for fabric bonding. The present invention relates to an article comprising a permeable or porous substrate bonded to at least one substrate with a hot melt moisture cure adhesive composition having a viscosity of less than about 60,000 cps and preferably less than about 30,000 cps at 250° F. The low viscosity property of the adhesive composition is advantageously combined with high green strength, as reflected by the peel resistance and/or storage modulus, G'. The storage modulus (G') of the adhesive composition after about 100 seconds of cooling ranges from about $1\times10^4$ dynes/cm$^2$ to about $1\times10^6$ dynes/cm$^2$. Further, the adhesive composition typically resists a bond displacement of about 20 mm for at least about 1 minute, and preferably for 10 minutes or longer. Advantageously, the composition of the present invention exhibits a higher storage modulus, (G') in comparison to other hot melt moisture cure adhesive composition having about the same complex modulus or stiffness. The composition is flexible, having a complex modulus (G*) ranging from about 100 seconds of cooling ranges from about $1\times10^4$ dynes/cm$^2$ to about $1\times10^7$ dynes/cm Additionally, the composition preferably exhibits high heat resistance, having a peel adhesion failure temperature greater than 250° F.

The hot melt moisture cure polyurethane composition is prepared from about 40 wt-% to about 80 wt-% of at least one polyol, from about 5 wt-% to about 50 wt-% of at least one thermoplastic polyurethane that is substantially free of hard segments and having a molecular weight (Mn) of greater than about 10,000 g/mole, and at least one polyisocyanate present at an equivalent ratio of isocyanate to hydroxyl ranging from about 1.2 to about 10. The polyol component is relatively low in molecular weight and in the case of fabric bonding, preferably amorphous.

In another embodiment, the present invention relates to a method of bonding a permeable or porous substrate, such as fabric, comprising coating the low viscosity, high green strength hot melt moisture curing adhesive composition. The adhesive composition can advantageously be applied at low application temperatures ranging from about 200° F. to about 300° F. The adhesive composition is well suited for gravure roll coating, pattern coating, and particularly porous coating hot melt adhesive application techniques, wherein small individual discrete deposits of the adhesive are applied to a substrate. Particularly in the case of porous coating, adhesive build-up on the die, known as "roll up" does not occur.

Thermoplastic polyurethane is preferably prepared in situ during preparation of the hot melt moisture cure adhesive composition. At least one polyol is polymerized with at least one polyisocyanate such that a thermoplastic polyurethane having terminal OH groups and a molecular weight greater than 10,000 g/mole is formed. A second polyol having a molecular weight of less than about 5000 g/mole is added followed by a second addition of polyisocyanate. In preferred embodiments, the second polyol is the same polyol as employed in the preparation of the high molecular weight thermoplastic polyurethane.

DETAILED DESCRIPTION OF THE INVENTION

The adhesive composition is particularly useful for hot melt application techniques that apply discrete individual deposits of adhesive to a substrate such as engraved roll coating, pattern coating and in particular the Nordson Porous Coat™ System, as described in U.S. Pat. No. 5,750,444; incorporated herein by reference. In comparison to conventional slot-coating and spray techniques for applying hot melt adhesives, methods that apply discrete individual deposits of adhesive offer some distinct advantageous. In one aspect, such methods typically employ lower amounts of adhesive per area of substrate being coated. This not only reduces the total adhesive consumption and thus, the total adhesive cost, but more importantly in the case of fabric bonding, reduces undesirable properties contributed by the adhesive such as reduced breathability and increased stiffness. As used herein, "fabric" refers to a woven or nonwoven textile material formed from fibers of such materials as cotton, wool, polyester, polyamide, polyurethane, as well as various polyolefins. The majority of thermoplastic adhesive compositions do not exhibit good moisture vapor transmission properties. Accordingly, if a breathable fabric is coated with such adhesive compositions, the breathability is greatly diminished by the hot melt adhesive coating.

The Nordson Porous Coat™ System employs a slot die to dispense hot melt adhesive in a fibrous or porous adhesive matrix by means of metering pumps feeding independently and separately controlled slot dies. The adhesive pattern or matrix is typically contact coated directly onto a substrate. The adhesive can be applied at very low coating weights ranging from about 0.075 to about 30 grams per square meter. For breathable composites, the majority of the surface area of the substrate is not coated with adhesive. Hence, the coating weight typically ranges from about 1.5 to 12 grams per square meter.

The adhesive composition of the present invention has been found to be particularly suitable for porous coating in view of the fact that the adhesive is substantially free of a process phenomena known as "roll up". "Roll up" occurs when the adhesive mitigates up the lip of the die and collects on the shelf. The adhesive build-up subsequently releases onto the substrate yielding an undesirable coating. Roll up is surmised to be caused by the adhesive exhibiting a higher cohesive strength than adhesive bond strength to the substrate being coated.

Pattern coating involves extruding a hot melt adhesive through a rotating screen that in turn deposits the adhesive directly onto the substrate to be coated. Alternatively, the screen may deposit the adhesive first onto release paper and then transfer coat the adhesive onto the intended substrate. The screens typically used in this process range from about 15 mesh to about 195 mesh, preferably from about 30 to 60 mesh, and more preferably from about 30 to 40 mesh. The 30 to 60 mesh screen results in individual hot melt adhesive deposits ranging in mass from as little as about $5 \times 10^{-5}$ grams per adhesive deposit to about 0.05 grams per adhesive deposit.

In the case of engraved roller applications, the adhesive is provided in a molten form in a reservoir. A roller that has been engraved with depressions is positioned such that as the roller revolves, a portion of the roller contacts the molten adhesive. Excess molten adhesive that is not present within the depressions is typically scraped off the roller. The roller is then subsequently contacted to a substrate, depositing the adhesive within the engraved depressions onto the substrate. The temperature of the roller may be controlled by a heating and/or cooling means. In any event, the roller typically reaches the temperature of the molten adhesive ranging from about 90° C. to about 180° C. For heat sensitive substrates such as low gauge polyolefin films, preferably the temperature of the roller does not exceed about 160° C. and more preferably the roller is maintained at a temperature of about 140° C. or less and more preferably at a temperature ranging from about 90° C. to about 125° C.

After coating by any of these methods, the number of individual hot melt adhesive deposits per area of substrate ranges from as little as 1 per square inch to as many as about 600 per square inch. The total mass of adhesive per area ranges from as little as about 5 g/m² to about 50 g/m². However, higher amounts may be useful for some applications requiring very aggressive adhesion and wherein the breathability is not of concern.

Preferably, the adhesive is coated directly onto the substrate to insure that a mechanical rather than merely a surface bond is formed with the fibers of the fabric. Transfer coating is generally less desirable, particularly since most of the heat has dissipated by the time the adhesive is transferred onto the substrate. However, transfer coating may also be suitable, provided the open time of the adhesive is amenable to forming bonds of sufficient strength.

Although, the adhesive composition is particularly amenable to gravure roll coating, pattern coating, and porous coating, the composition may also be applied with other application techniques such as spray, slot coating, extrusion coating, roll coating and melt blown hot melt application techniques.

The hot melt moisture cure adhesive composition is substantially solid, having a high viscosity at room temperature. The viscosity is typically at least about $1 \times 10^6$ cps at 25° C. Further, the glass transition temperature (Tg) ranges from about −40° C. to about 10° C. and preferably from about −20° C. to about 0° C. The open time of the adhesive composition ranges from 5–10 seconds to about 10 minutes or longer, depending on various application variables such as coat weight, application temperature, method of application, etc. When porous coated, the open time is surmised to be about 5 seconds.

The hot melt moisture cure adhesive composition may be applied at temperatures ranging from about 200° F. to about 400° F. However, in order to be suitable for direct coating onto heat sensitive substrates, the adhesive composition must have a low viscosity at a temperature less than about 300° F., more preferably less than about 275° F., and most preferably ranging from about 200° F. to about 250° F. Low application temperatures are also preferred in order'to minimize thermal degradation of the adhesive and for worker safety considerations.

The viscosity of the adhesive composition of the invention at application temperature is less than 500,000 cps and typically less than 100,000 cps. For porous, pattern and engraved roll coating the viscosity is preferably less than about 60,000 cps, and more preferably less than about 30,000 cps, and in some embodiments less than 15,000 cps. It is desired that the molten viscosity be as low as possible at as low of a temperature as possible without reducing the storage modulus and complex modulus after about 100 seconds of cooling below the targeted range. At too high of a viscosity, higher application temperatures are needed that may cause heat deformation of the substrates being bonded. At too low of a viscosity, however, the adhesive composition seeps into the fabric causing undesirable stiffness and blocking as a result of the adhesive striking through the substrate.

The moisture in the substrates and atmospheric moisture are normally sufficient for setting, although the reaction may be accelerated by additional spraying with water and/or media containing polyols or catalysts.

The adhesive composition of the present invention obtains high green strength without becoming too viscous for the application or without becoming too stiff for good wet out and good adhesion. In the present invention, the complex modulus, (G*), represents the relative stiffness of the composition. The complex modulus is the combination of the viscous modulus and elastic modulus component as determined by Dynamic Mechanical Analysis (DMA). The higher the G*, the stiffer the material. Further, the lower the tan δ, the more elastic and creep resistant the material.

The adhesive composition of the present invention exhibits a complex modulus of at least about $1 \times 10^4$ dynes/cm$^2$ after about 100 seconds of cooling. Preferably, the complex modulus is greater than about $5 \times 10^4$ dynes/cm$^2$, more preferably greater than about $1 \times 10^5$ dynes/cm$^2$ and most preferably greater than about $2 \times 10^5$ dynes/cm$^2$ after about 100 seconds of cooling. Particularly in the case of fabric bonding, the adhesive composition remains flexible after curing and thus, exhibits a complex modulus of less than $1 \times 10^7$ dynes/cm$^2$, preferably less than about $5 \times 10^6$ dynes/cm$^2$, and most preferably less than about $2 \times 10^6$ dynes/cm$^2$.

The green strength is the initial strength of the composition immediately following application. Green strength can be measured in a number of ways. Accordingly, the green strength is typically expressed in relation to a specific test method. In the present invention, green strength is represented by the storage modulus () as measured by DMA after about 100 seconds as well as by the peel resistance. The hot melt moisture cure composition of the invention exhibits a relatively high green, strength as a function of stiffness, meaning that the G' of the composition is at least 25% higher than a hot melt moisture cure composition having the same G*. In preferred embodiments, the ranges from being about 50%–100% higher than a hot melt moisture cure composition having the same G*. Surprisingly, these properties can be obtained without a corresponding increase in molten viscosity. The storage modulus is typically at least about $1 \times 10^4$ dynes/cm$^2$ after about 100 seconds of cooling. Preferably, the complex modulus is greater than about $5 \times 10^4$ dynes/cm$^2$, more preferably greater than about $1 \times 10^5$ dynes/cm$^2$ and most preferably greater than about $2 \times 10^5$ dynes/cm$^2$ after about 100 seconds of cooling.

The peel resistance is the displacement of a bond as a function of time. For a given weight, the lower the displacement or the longer the time, the higher the green strength. The hot melt moisture cure adhesive composition typically exhibits a peel resistance of at least about 1 minute, meaning that a 1" wide bond displaces 20 mm with a 100 g weight. Preferably, the peel resistance is at least about 2 minutes, more preferably at least about 5 minutes, and most preferably about 10 minutes or greater. In the case of fabric bonding the peel resistance at lower weights 10–20 grams tends to more important than the peel resistance at higher weights, 100 grams.

Preferably, the adhesive composition exhibits high heat resistance, as measured by the peel adhesion failure temperature (PAFT). Accordingly, the PAFT is typically greater than about 250° F., more preferably greater than about 270° F., and more preferably greater than about 290° F. "Hot melt moisture cure adhesive" is an adhesive composition substantially free of solvents and having urethane groups. The composition is substantially solid at room temperature, having a viscosity at 25° C. of at least $1 \times 10^6$ cps. The composition is heated to a temperature ranging from about 100° C. to about 200° C. and applied in a molten state. The composition physically bonds initially by cooling and also by a moisture induced chemical reaction of isocyanate groups present within urethane prepolymer. It is only subsequent to such chemical curing that the adhesive attains its final characteristics.

A "polyurethane prepolymer" or "prepolymer" is an oligourethane having isocyanate groups which is to be regarded as an intermediate on the way to the crosslinked polyurethanes.

The hot melt moisture cure adhesive of the invention comprises at least one polyurethane prepolymer prepared from at least one polyol, at least one polyisocyanate, and at least one high molecular weight thermoplastic polyurethane (TPU) that is substantially free of hard segments. The TPU may be unreactive. However, preferably the TPU has NCO or OH functionality such that it is reacted into the prepolymer of the hot melt moisture cure composition. Thus, in some embodiments, the polyurethane prepolymer and hot melt moisture cure adhesive composition as one in the same. In other embodiments, wherein the TPU is unreactive or wherein other nonreactive ingredients such as tackifiers and thermoplastic polymers are added, the prepolymer is an ingredient of the hot melt moisture cure adhesive composition.

The preparation of isocyanate-terminated polyurethane prepolymers is well known in the art. Prepolymers with residual isocyanate groups are formed by reaction of (1) a mixture of at least one hydroxy functional polymer wherein the total mixture generally has a combined number average molecular weight of about 1,000 to 10,000, preferably of about 1,000 to 6,000, and more preferably of about 2,000 to 5,000 and (2) at least one polyisocyanate, preferably a diisocyanate. The molecular weight of the polyol is selected based on the intended application equipment and substrates to be bonded. Increasing molecular weight makes extrusion of the hot-melt adhesive and penetration into porous or permeable substrates more difficult, whereas decreasing molecular weight can result in the hot melt adhesive being not sufficiently solid at room temperature.

The polyol may be a linear or slightly branched polyester, a polyether or other OH-terminated polymer such as polybutadiene diol. Particular polyesters such as polycaprolactones or polycarbonates may also be used. Preferred prepolymers are based on linear or slightly branched aliphatic or aromatic polyesters containing primary hydroxyl end groups. Other useful polyesters contain secondary hydroxyl or carboxyl end groups. Further, a blend of non-linear and linear polyesters may also be employed.

In general, the selection of polyol(s) is based on the intended end use. For textile bonding and in particular textile bonding with the Nordson Porous Coat™ System, it is preferred that the polyols are substantially amorphous. For the purpose of the present invention "amorphous" is defined as a component or composition having a heat of fusion of less than about 15 joules/gram. Preferably, the heat of fusion is less than about 10 joules/gram, more preferably less than about 5 joules/gram and most preferably less than about 1 joule/gram. The hot melt moisture cure adhesive of the present invention advantageously attains its high initial strength from the TPU and not from crystallinity. Surprisingly, this approach does not result in a correspondingly high stiffness. However, to prevent blocking at increased line speeds, semi-crystallinine polyols may be advantageous. Further, crystalline polyols are surmised to be suitable for other applications that employ hot melt moisture cure adhesive compositions for bonding plastic, wood, metals, and glass, for example.

The amount of polyol used in the preparation of the hot melt moisture cure adhesive composition typically ranges from about 20 wt-% to about 85 wt-%. Preferably, the polyol component(s) range from about 15 wt-% to about 70 wt-% and most preferably from about 15 wt-% to about 60 wt-%.

Suitable polyether polyols for use in the preparation of the prepolymer include polyalkylene glycol, a linear polyether having 2 OH groups and the general formula HO (—R—O)$_m$ —H, wherein R is a hydrocarbon residue having from 2 to 4 C atoms. Similarily, random and block copolymers are also possible. Specific polyalkylene gylcols for use in the invention include polyethylene glycol, polytetramethylene glycol and polypropylene glycol.

Other suitable polyether polyols for use in the preparation of the prepolymer include compounds that are homopolymers or copolymers formed from one or more alkylene oxide such as ethylene oxide, propylene oxide, 1,2-butylene oxide, 1,4-butylene oxide and mixtures thereof. As in the case of polyalkylene glycol, these polyether polyols may also have a random or block configuration. The higher the oxygen content of the polyol and/or the polyurethane composition, the higher the moisture vapor transmission rate. Accordingly, for adhesive applications wherein breathability is important, polyether polyols are preferred. Employing high molecular weight ethylene oxide as the sole polyol, typically results in a composition that exhibits poor flexibility. However, small concentration of polypropylene oxide or butylene oxide can be added to overcome this deficiency.

Various polyester polyols having two, preferably terminal, OH groups are preferred for use in the formation of the prepolymer. The preparation of polyester polyols from various aromatic acids (such as isophthalic or terephthalic acid) and/or aliphatic acids (such as adipic, acelaic or sebacic acid) and low molecular diols (such as ethylene glycol, butane diol, hexane diol etc) is known. Specific preferred starting materials are typically 1,4-butanediol, 1,6-hexanediol, neopentyl glycol, ethylene glycol, diethylene glycol as well as phthalic anhydride, cyclohexanedicarboxylic, terephthalic, isophthalic, adipic, azelaic, dodecanedioic, dimer, and sebacic acids. Other derivatives that may be employed include e.g., lactones, methyl esters and anhydrides.

The polyesters may be produced in a known manner by melt condensation of the dicarboxylic acids with an excess of the diol component at temperatures in the range from 180° C. to 280° C. Catalysts or entraining agents, such as toluene for example, may also be used. The polyesters may also be produced by transesterification of dicarboxylic acid esters with diols, such as for example terephthalic acid dimethyl ester with hexane 1,6-diol. The carbonic acid esters are preferably obtained by transesterification of carbonic acid esters, such as for example diphenyl carbonate or carbonic acid diphenyl ester, and an excess of diols.

Whereas the polyols employed for the preparation of the thermoplastic polyurethane are chosen such that the polyurethane is substantially free of hard segments, short chained diols having a molecular weight of less than 600 and preferably less than 400 may optionally be used in the preparation of the hot melt moisture cure adhesive composition. These relatively low molecular weight diols are preferably used in low quantities, for examples up to about 25 wt-%, preferably less than 10 wt-% and most preferably less than 5 wt-% of the total active hydrogen content. Suitable low molecular weight diols optionally used include, di-, tri- and/or tetraethylene glycol, 1,4-dimethylol cyclohexane or reaction products of 4,4'-hydroxyphenyl propane with ethylene and/or propylene oxide. For special effects, it is possible to use diols containing ions and/or structural elements containing ionic groups, such as for example dimethylol propionic acid, N-methyl diethanolamine and/or reaction products of sodium bisuifite and propoxylated butene- 1,4-diol.

Solid or high viscosity liquid polyester glycols are preferred to prevent cold flow of the solid hot melt moisture cure adhesive as well as to improve the initial strength obtained from solidification. As previously discussed, in the case of textile bonding, the polyester polyols are preferably amorphous since crystalline character tends to increase the stiffness of the adhesive coated fabric. However, for applications wherein increased stiffness is not a critical property, crystalline polyols may be employed. Crystalline polyester polyols typically have a melt point from about 40° C. to about 120° C. and glass transition temperatures, (Tg), of less than about 0° C. Preferably, the crystalline polyester polyols are the reaction product of either hexane diol or butane diol, and an acid which may include adipic acid, dodecanedioic acid, sebacic acid, terephthalic acid and mixtures thereof Further, copolymers with other acids and glycols can also be used. Examples of useful polyester polyols include Dynacoll.RTM. 7380 and Dynacoll.RTM. 7381, commercially available crystalline polyester polyols available from CreaNova Inc. in Piscataway, N.J. Polyols having a melt point of less than about 40° C. tend to result in compositions that set slowly while the polyols having a melt point of greater than about 120° C., on the other hand, require high application temperatures applications. For finished hot melt moisture polyurethane cure compositions having a set time of less than about 20 seconds, crystalline polyester polyols are useful from an amount ranging from about 20% to about 50% by weight of the composition, preferably from about 20% to about 40% by weight and most preferably from about 20% to about 30% by weight of the composition. In general, the higher the percentage of crystalline polyester polyol, the faster the finished composition will set.

The hot melt moisture cure adhesive comprises at least one polyisocyanate present in the prepolymer composition in an equivalent amount greater than that of the hydroxy containing component. The equivalent ratio of isocyanate to hydroxyl is preferably from about 1.2 to about 10 to 1.0 and especially preferably from about 1.6 to 3.0 to 1.0. A "polyisocyanate" is a low molecular weight compound having from 2 to 3 isocyanate groups. Diisocyanates are preferred. Trifunctional isocyanate may be employed at concentrations up to about 10 wt-% provided that inclusion of such does not result in undesirable crosslinking during production and use of the hot melt adhesive:

Suitable polyisocyanates include aliphatic and cycloaliphatic polyisocyanates, aromatic polyisocyanates and-mixtures thereof. Specific examples include toluene diisocyanate (TDI), diphenylmethane diisocyanate (MDI) and mixtures thereof. Diphenylmethane diisocyanate is understood to be both 4,4'- and 2,4'-diphenylmethane diusocyanate. Preferably, the 2,4'-isomer should not exceed 50% by weight. Other polyisocyanates include naphthylene-1,5-diisocyanate; triphenylmethane-4,4'4"-triisocyanate; phenylene-1,3-diisocyanate and -1,4-diisocyanate; dimethyl-3,3'biphenylene-4,4'-diisocyanate; diphenylisopropylidine-4,4'-diisocyanate; biphenylene diisocyanate; xylene -1,3-diisocyanate and xylene -1,4-dilsocyanate. Further, aliphatic diisocyanates are preferred for polyurethane prepolymers with high ultraviolet stability.

Isocyanate-functional derivative(s) of MDI and TDI may be used, such as liquid mixtures of triisocyanate functional derivative with melting point modifiers (e.g., mixtures of MDI with polycarbodiimide adducts such as "Isonate 143L", commercially available from the Dow Chemical Co., and "Mondur CD", commercially available from Mobay Chemical Corp.; small amounts of polymeric diphenylmethane diisocyanates, preferably 10% or less by weight of the total isocyanate component, (e.g., "PAPI", and the series "PAPI 20" through "PAPI 901", commercially available from the Dow Chemical Co., "Mondur MR", "Mondur MRS", and "Mondur MRS-10", commercially available from Mobay Chemical Corp., and "Rubinate M", commercially available from ICI Chemicals, Inc.); and blocked isocyanate compounds formed by reacting aromatic isocyanates or the above-described isocyanate-functional derivatives with blocking agents such as ketoximes and the like.

The adhesive composition of the present invention comprises at least one thermoplastic polyurethane (TPU) that is substantially free of hard segments. Typical TPU's are prepared with low molecular weight diol or polyol chain extenders. The presence of such increases the softening point and melt viscosity of the TPU that in turn increases the strength and toughness. In contrast, the TPU's for use in the reactive hot melts of the present invention are prepared without low molecular weight chain extenders and thus do not contain urethane hard segments. Although not preferred, incremental amounts of low molecular weight diol/polyol may be employed, provided the resulting adhesive composition exhibits the desired properties of high green strength, reduced stiffness, and preferably low viscosity. In addition to being substantially free of hard segments, the TPU's for use in the adhesive of the invention are relatively high in molecular weight, having a number average molecular weight (Mn) of at least about 10,000 g/mole and preferably greater than 20,000 g/mole. The number average molecular weight, Mn, is an estimate from the theoretical OH# of the TPU. For example, when made from diols, the Mn≈2×(56100/TPU OH#).

The TPU is preferably synthesized in accordance with same techniques as used in the preparation of hot melt moisture cure adhesive compositions, with the exception that the TPU in itself is not necessarily NCO terminated and thus, not moisture curing. Rather, the TPU can be prepared such that it is either unreactive or preferably hydroxyl functional such that it becomes reacted into the hot melt moisture cure prepolymer. In preferred embodiments, the polyol for use in the preparation of the TPU is the same as the polyol component added to the TPU in the preparation of the hot melt moisture cure adhesive composition.

The amount of TPU employed in the adhesive composition ranges from about 5wt-% to about 50 wt-% and typically ranges from about 10 wt-% to about 40 wt-% in the reactive hot melt composition. For low viscosity compositions, the amount of TPU preferably ranges from about 10 wt-% to about 30 wt-%. However, for other applications in which higher viscosity compositions are suitable for use, higher amounts and even higher molecular may be employed.

The hot melt moisture cure adhesive composition of the invention can contain other ingredients or adjuvants if desired. For example, fillers (e.g. carbon black, metal oxides such as zinc oxide, and minerals such as talc, clays, silica, silicates, and the like), thermoplastic resins, plasticizers, extending oils antioxidants, pigments, U.V. absorbers, adhesion promoters such as silanes, and the like may be included to impart particular characteristics to the composition. These adjuvants generally can comprise up to 50 weight percent of the composition either individually or in combination.

In addition, the compositions can contain an effective amount of catalyst or reaction accelerator such as tertiary amines, metal-organic compounds, co-curatives such as oxazolidine, and the like. The amount ranges from 0 to 1.5, in particular, from 0.01 to 0.5% by weight based on the weight of prepolymer.

While the compositions of the invention that are best suited by the Nordson Porous Coat™ System are preferably essentially non-phasing, some separation of the polyester components is acceptable for other bonding applications. Moreover, the degree of phasing can be adjusted by varying any or several of certain factors. For example, the degree of chain extension of the polyol, the molecular weight of the polyol and the choice of isocyanate all influence phase separation.

The adhesive compositions of the invention may be prepared by mixing the components at elevated temperature, using conventional mixing techniques. It is preferred to mix the components under anhydrous conditions. Generally, preparation of the adhesive is done without the use of solvents.

The hot melt compositions of the invention achieve their initial, or green, strength through cooling from a liquid state to a solid/semi-solid state and then continue to cure by exposure to water, e.g., water vapor or moisture. High humidity and heat will provide an accelerated rate of cure while low humidity (e.g., 15% R.H. or less) will provide a slower rate of cure.

The polyurethane systems containing isocyanate groups may be produced, for example, by mixing the thermoplastic polyurethane and lower molecular weight polyol, mixing the resulting mixture with an excess of the polyisocyanate and packaging the homogeneous mixture or stirring it until a constant NCO value is obtained, followed by packaging. The reactive polyurethane systems may also be produced continuously in a cascade of stirred tanks or in suitable mixing units, for example in high-speed mixers on the rotor-stator principle. However, the thermoplastic polyurethane and lower molecular weight polyol may also be separately reacted with the polyisocyanate and the prepolymers containing isocyanate groups subsequently mixed in the ratio according to the invention and packaged. In a preferred method of preparation, the thermoplastic polyurethane is made in situ in the reactor, followed by the addition of low molecular weight polyol and additional isocyanate.

Although the low viscosity embodiments are particularly well-suited for porous coating and the bonding of fabrics, the adhesive composition is suitable for a variety'of other hot melt moisture cure adhesive applications. In particular, the hot melt moisture cure composition can be used to bond various plastic and polymerics such as ABS, PVC, plasticized PVC, polycarbonate, polystyrene, EPDM rubber, butyl rubber, polycyclopentadiene, polychloroprene, various block copolymer rubbers such as SIS and SBS, polyamide, nylon, polyolefins, polyester, polyurethanes rubber, polyurethane foam, silicone, polytetrafluoroethylene, ethylene vinyl acetate, foamed EVA, etc. Further, the adhesive composition is suitable for bonding painted surfaces (e.g. epoxy polyester, TGIC, polyurethane, nitocellulose laquere), metal bonding (e.g. cold rolled steel, galvanized steel, phosphatized steel, aluminium, anodized aluminum, stainless steel, copper, magnesium, brass) glass, cellulose and cellulose composites (e.g. plywood, particle board, high pressure laminant, medium density fiberboard, orinetated strandboard, sponge, cellulose sponge) as well as other composites such as fiberglass, graphite and kevlar.

The invention is further illustrated by the following non-limiting examples.

Test Methods
1. DMA Testing—The adhesive sample is heated for about 30 minutes at 250° F. and applied to bottom plate of parallel plate rheometer equilibrated at 25° C. The top plate is pressed onto the sample forming about a 1 mm gap and the sample is tested at 1 radians/second as the sample cools and sets at 25° C. Various measurements such as the storage modulus, G'; the loss modulus, G"; the complex modulus, G*, [the square root of the sum of $(G')^2 + (G'')^2$]; and the tan δ, (ratio of the loss modulus divided by the storage modulus) is recorded as function of time as the material sets. A temperature sweep at 10 radians/seconds is employed for the purpose of measuring the flow properties of the material in its molten state.
2. Brookfield Viscosity—The molten viscosity is determined with Brookfield models DVH, DV-II or DV-III. An appropriate spindle size and hot melt adhesive sample size was selected in accordance with the viscometer manufacturers instructions. The adhesive sample was melted in the thermocel at the temperature at which the viscosity was to be measured. The spindle was lowered into the melted adhesive sample. The motor was turned on at the lowest speed and the corresponding torque reading displayed. The speed was increased until the torque reading stabilized and the viscosity measurement recorded after 30 minutes.
3. Peel Resistance—A adhesive sample is heated and coated onto a 1" wide aluminum strip using a heated draw down bar with a 0.005" gap. The aluminum strip is placed on a 120° C. hot plate or in a 120° C. oven for one minute. The strip is removed from the hot plate or oven and a 1" wide piece of canvas is applied to the strip and then immediately hand rolled to form a bond. The aluminum strip is attached vertically to a holder and after a given period of time, a weight is attached to one end of the fabric forming a 180° peel angle. The cooling time before applying the weight and the displacement verses time is recorded for the material.
4. Peel Adhesive Failure Temperature (PAFT)—The adhesive was heated to 250° F. and applied to #10 canvas with a 10 mil heated drawdown bar. Two 1" wide pieces of canvas were mated and rolled having a total adhesive thickness of 20 mils. The samples were cured for 2–3 weeks in a 75° F./50% relative humidity chamber. After curing, the samples were placed in a programmed oven with 1 kg weights, ramping the temperature up from 25° C. to 175° C. at a rate of 25° C. per hour. The oven automatically records the temperature at which the samples fail. The reported result is the average of 5–7 samples.

Examples 1, 4, 9, 11, 13 and 20 describe the preparation of high molecular weight thermoplastic polyurethanes that are free of hard segments. The thermoplastic polyurethanes are then employed as reactants in the preparation of the hot melt moisture cure adhesive compositions of Examples 2–3, 5–6, 8, 10, 12, 14 and 21. Examples 7, 15–19 and 22 illustrate the preparation of the high molecular weight thermoplastic polyurethanes that are free of hard segments in situ during the synthesis of the reactive adhesive composition. A variety of crystalline and amorphous polyols are employed. Examples 2–3, 5–7, 15 and 17 are prepared solely with amorphous components, whereas the remaining examples contain at least one crystalline component in the preparation of the TPU, the preparation of the hot melt moisture cure adhesive composition, or both.

EXAMPLE 1

Preparation TPU-1

359.59 parts of 55 OH#, 1 acid # hexane diol phthalic anhydride polyester polyol was melted and added to a 500 ml reaction kettle and mixed under vacuum at 100° C.–135° C. for about 2 and ½ hours. 40.412 parts MDI (NCO/OH ratio of 0.90/1, theoretical OH # of 5, theoretical molecular weight of ~22,000 g/mole) was added and allowed to react under vacuum for 1 hour at 120° C.–150° C. The sample was discharged and cooled.

EXAMPLE 2

Preparation of HMMC-1 with TPU-1

91.56 parts Poly G 55-56 (56 OH# ethylene oxide capped polypropylene oxide polyether polyol available from Arch Chemical) and 0.09 parts 85% phosphoric acid were added to a 500 ml reaction kettle. 75 parts 55 OH#, 1 acid# hexane diol phthalic anhydride polyester polyol was melted and added to the reaction vessel and 90 parts of TPU-1 (from Example 1) was added to the reaction vessel and mixed under vacuum at 100° C.–135° C. 43.35 parts MDI (NCO/OH ratio of 2.0/1) was added and allowed to react under vacuum for 1 hour. The material had a viscosity of 10,850 cps at 250° F. The peel resistance of the sample was measured. After hanging a 10 g weight 1 minute after cooling, it took about 7 minutes for the sample to peel a distance of 20 mm. A DMA scan of the material as it set at 25° C. was carried out. After 100 seconds of cooling, it had a G' of $2.0 \times 10^{4th}$ dynes/cm$^2$, a G* of $8.2 \times 10_{4th}$ dynes/cm$^2$ and a tan δ of about 4. After 2000 seconds of cooling it had a G' of $4.0 \times 10_{4th}$ dynes/cm$^2$, a G* of $1.3 \times 10^{5th}$ dynes/cm$^2$ and a tan δ of about 3.1.

EXAMPLE 3

Preparation of HMMC-2 with TPU- 1

46.56 parts Poly G 55-56 (56 OH# ethylene oxide capped polypropylene oxide polyether polyol available from Arch Chemical) and 0.09 parts 85% phosphoric acid were added to a 500 ml reaction kettle. 120 parts 55 OH#, 1 acid# hexane diol phthalic anhydride polyester polyol was melted and added to the reaction vessel and 90 parts TPU-1 (of Example 1) was added to the reaction vessel and mixed under vacuum at 100° C.–135° C. 43.35 parts MDI (NCO/OH ratio of 2.0/1) was added and allowed to react under vacuum for 1 hour. The material had a viscosity of 14,125 cps at 250° F. The peel resistance of the sample was measured. After hanging a 100 g weight 1 minute after cooling, it took about 3.3 minutes for the sample to peel a distance of 20 mm. A DMA scan of the material as it set at 25° C. was carried out. After 100 seconds of cooling, it had a G' of $1.3 \times 10^{5th}$ dynes/cm$^2$, a G* of $2.9 \times 10^{5th}$ dynes/cm$^2$ and a tan δ of about 2. After 2000 seconds of cooling it had a G' of $1.9 \times 10^{5th}$ dynes/cm$^2$, a G* of $4.0 \times 10^{5th}$ dynes/cm$^2$ and a tan δ of about 1.8.

EXAMPLE 4

Preparation of TPU-2

357.21 parts of 56.7 OH#, 0.3 acid # hexane diol phthalic anhydride polyester polyol was melted and added to a 500 ml reaction kettle and mixed under vacuum at 100° C.–135° C. for about 2 hours. 42.788 parts MDI (NCO/OH ratio of 0.94/1, theoretical OH# of 2.9, theoretical molecular weight of 38,800 g/mole) was added and allowed to react under vacuum for 1 hour at 120° C.–150° C. The sample was discharged and cooled.

EXAMPLE 5

Preparation of HMMC-3 with TPU-2

48 parts Poly G 55-56 (56 OH# ethylene oxide capped polypropylene oxide polyether polyol available from Arch Chemical) and 0.09 parts 85% phosphoric acid were added to a 500 ml reaction kettle. 144 parts 55 OH#, 1 acid# hexane diol phthalic anhydride polyester polyol was melted and added to the reaction vessel and 60 parts of TPU-2 (of Example 4) was added to the reaction vessel and mixed under vacuum at 100° C.–135° C. 47.91 parts MDI (NCO/OH ratio of 2.0/1) was added and allowed to react under vacuum for 1 hour. The material had a viscosity of 11,425 cps at 250° F. The peel resistance of the sample was measured. After hanging a 100 g weight 1 minute after cooling, it took about 2 minutes for the sample to peel a distance of 20 mm. A DMA scan of the material as it set at 25° C. was carried out. After 100 seconds of cooling, it had a G' of $8.2 \times 10^{4th}$ dynes/cm$^2$, a G* of $1.9 \times 10^{5th}$ dynes/cm$^2$ and a tan δ of about 2.1. After 2000 seconds of cooling it had a G' of $1.6 \times 10^{5th}$ dynes/cm$^2$, a G* of $3.2 \times 10^{5th}$ dynes/cm$^2$ and a tan δ of about 1.8.

EXAMPLE 6

Preparation of HMMC-4 with TPU-2

48 parts Poly G 55-56 (56 OH# ethylene oxide capped polypropylene oxide polyether polyol available from Arch Chemical) and 0.09 parts 85% phosphoric acid were added to a 500 ml reaction kettle. 129 parts 55 OH#, 1 acid# hexane diol phthalic anhydride polyester polyol was melted and added to the reaction vessel and 75 parts of TPU-2 (of Example 4) was added to the reaction vessel and mixed under vacuum at 100° C.–135° C. 47.91 parts MDI (NCO/OH ratio of 2.1/1) was added and allowed to react under vacuum for 1 hour. The material had a viscosity of 23,100 cps at 250° F. The peel resistance of the sample was measured. After hanging a 100 g weight 1 minute after cooling, it took about 7 minutes for the sample to peel a distance of 20 mm. A DMA scan of the material as it set at 25° C. was carried out. After 100 seconds of cooling, it had a G' of $1.2 \times 10^{5th}$ dynes/cm$^2$, a G* of $2.3 \times 10^{5th}$ dynes/cm$^2$ and a tan δ of about 1.6. After 2000 seconds of cooling it had a G' of $2.3 \times 10^{5th}$ dynes/cm$^2$, a G* of $3.8 \times 10^{5th}$ dynes/cm$^2$ and a tan δ of about 1.3.

EXAMPLE 7

Preparation of HMMC-5 with TPU-3

98.04 parts of 56.61 OH#, 0.39 acid # hexane diol phthalic anhydride polyester polyol was melted and added to a 500 ml reaction kettle and mixed under vacuum at 100° C.–135° C. for about 2 hours. 11.96 parts MDI (NCO/OH ratio of 0.96/1, theoretical OH # of 2, theoretical molecular weight of 56,000 g/mole) was added and allowed to react under vacuum for 3 hour at 120° C.–180° C. 336.24 parts 56.61 OH#, 0.39 acid# hexane diol phthalic anhydride polyester polyol was melted and added to the reaction vessel and mixed under vacuum at 100° C.–150° C. 103.76 parts MDI (NCO/OH ratio of 2.4/1) was added and allowed to react under vacuum for 1 hour. The material had a viscosity of 10,050 cps at 250° F. The peel resistance of the sample was measured. After hanging a 100 g weight 1 minute after cooling, it took about 3.8 minutes for the sample to peel a distance of 20 mm. After hanging a 20 g weight 30 seconds after cooling, it took about 13 minutes for the sample to peel a distance of 20 mm. Between 10 and 60 minutes after hanging the 20 g weight, the sample peeled a distance of about 28 mm. After hanging a 10 g weight 30 seconds after cooling, it took about 47 minutes for the sample to peel a distance of 20 mm. Between 10 and 60 minutes after hanging the 10 g weight, the sample peeled a distance of about 20 mm. A DMA scan of the material as it set at 25° C. was carried out. After 100 seconds of cooling, it had a of $1.6 \times 10^{5th}$ dynes/cm$^2$, a G* of $3.2 \times 10^{5th}$ dynes/cm$^2$ and a tan δ of about 1.8. After 2000 seconds of cooling it had a G' of $2.4 \times 10^{5th}$ dynes/cm$^2$, a G* of $4.8 \times 10^{5th}$ dynes/cm$^2$ and a tan δ of about 1.7.

EXAMPLE 8

Preparation of HMMC-6 with TPU-2

54 parts 22.8 OH#, 0.2 acid# hexane diol adipate and 129 parts 57.2 OH#, 0.02 acid# hexane diol phthalic anhydride polyester polyol were melted and added to a 500 ml reaction kettle. 75 parts of TPU-2 (of Example 4) and 0.09 parts 85% phosphoric acid were added to the reaction vessel and mixed under vacuum at 100° C.–135° C. 41.91 parts MDI (NCO/OH ratio of 2.1/1) was added and allowed to react under vacuum for 1 hour. The material had a viscosity of 21,350 cps at 250° F. The peel resistance of the sample was measured. After hanging a 100 g weight 1 minute after cooling, it took more than 9 minutes for the sample to peel a distance of 20 mm. A DMA scan of the material as it set at 25° C. was carried out. After 100 seconds of cooling, it had a G' of $1.4 \times 10^{5th}$ dynes/cm$^2$, a G* of $3.1 \times 10^{5th}$ dynes/cm$^2$ and a tan δ of about 1.9. After 2000 seconds of cooling the sample had started to crystallize and it had a G' of $3.9 \times 10^{6th}$ dynes/cm$^2$, a G* of $5.0 \times 10^{6th}$ dynes/cm$^2$ and a tan δ of about 0.8.

EXAMPLE 9

Preparation of TPU-4

356.35 parts of 57.2 OH#, 0.02 acid # hexane diol phthalic anhydride polyester polyol was melted and added to a 500 ml reaction kettle and mixed under vacuum at 100° C.–135° C. for about 3 hours. 43.65 parts MDI (NCO/OH ratio of 0.96/1, theoretical OH # of 2, theoretical molecular weight of 56,000 g/mole) was added and allowed to react under vacuum for 1 hour at 120° C.–150° C. The sample was discharged and cooled.

EXAMPLE 10

Preparation of HMMC-7 with TPU-4

50.4 parts Dynacoll 7381 (31.8 OH#, 0.5 acid# crystalline polyester polyol available from CreaNova) and 138 parts 57.2 OH#, 0.02 acid# hexane diol phthalic anhydride polyester polyol were melted and added to a 500 ml reaction kettle. 60 parts of the TPU-4 (of Example 9) was added to the reaction vessel and mixed under vacuum at 100° C.–135° C. 51.6 parts MDI (NCO/OH ratio of 2.4/1) was added and allowed to react under vacuum for 1 hour. The sample crystallized in less than 5 minutes when cooled to room temperature. The material had a viscosity of 21,000 cps at 250° F. The peel resistance of the sample was measured. After hanging a 100 g weight 1 minute after cooling, it took more than 9 minutes for the sample to peel a distance of 20 mm. A DMA scan of the material as it set at 25° C. was carried out. After 100 seconds of cooling, it had a G' of $3.8 \times 10^{5th}$ dynes/cm$^2$, a G* of $5.8 \times 10^{5th}$ dynes/cm$^2$ and a tan δ of about 1.15. After 2000 seconds of cooling the sample had a G' of $1.4 \times 10^{6th}$ dynes/cm$^2$, a G* of $2.0 \times 10^{6th}$ dynes/cm$^2$ and a tan δ of about 1. The PAFT of the adhesive composition was determined to be 334° F.

EXAMPLE 11

Preparation of TPU-5

231.96 parts of 54.2 OH#, 0.64 acid # hexane diol phthalic anhydride polyester polyol and 131.98 parts Dynacoll 7381 (31.8 OH#, 0.5 acid# crystalline polyester polyol available from CreaNova) were melted and added to a 500 ml reaction kettle and mixed under vacuum at 100° C.–135° C. for about 1 hour. 36.06 parts MDI (NCO/OH ratio of 0.95/1, theoretical OH # of 2, theoretical molecular weight of 56,000 g/mole) was added and allowed to react under vacuum for 1 hour at 120° C.–150° C. The sample was discharged and cooled.

EXAMPLE 12

Preparation of HMMC-8 with TPU-5

40 parts Dynacoll 7381 (31.8 OH#, 0.5 acid# crystalline polyester polyol available from CreaNova) and 210 parts 54.2 OH#, 0.64 acid# hexane diol phthalic anhydride polyester polyol were melted and added to a 500 ml reaction kettle. 80 parts of the TPU-5 (of Example 11) was added to the reaction vessel and mixed under vacuum at 100° C.–135° C. 69.99 parts MDI (NCO/OH ratio of 2.4/1) was added and allowed to react under vacuum for 1 hour. The sample crystallized in less than 5 minutes when cooled to room temperature. The material had a viscosity of 13,825 cps at 250° F. The peel resistance of the sample was measured. After hanging a 10 g weight 1 minute after cooling, it took about 5.5 minutes for the sample to peel a distance of 20 mm. A DMA scan of the material as it set at 25° C. was carried out. After 100 seconds of cooling, it had a G' of $5.5 \times 10^{5th}$ dynes/cm$^2$, a G* of $9.0 \times 10^{5th}$ dynes/cm$^2$ and a tan δ of about 1.3. After 2000 seconds of cooling the sample had a G' of $1.3 \times 10^{6th}$ dynes/cm$^2$, a G* of $2.0 \times 10^{6th}$ dynes/cm$^2$ and a tan δ of about 1.2.

EXAMPLE 13

Preparation of TPU-6

358.03 parts of 54.2 OH#, 0.64 acid # hexane diol phthalic anhydride polyester polyol was melted and added to a 500 ml reaction kettle and mixed under vacuum at 100° C.–135° C. for about 1 hour. 41.966 parts MDI (NCO/OH ratio of 0.96/1, theoretical OH # of 2, theoretical molecular weight of 56,000 g/mole) was added and allowed to react under vacuum for 1 hour at 120° C.–150° C. The sample was discharged and cooled.

EXAMPLE 14

Preparation of high green strength reactive hot melt, HMMC-9 with TPU6

40 parts Dynacoll 7381 (32 OH#, 1.2 acid# crystalline polyester polyol available from CreaNova), 20 parts 22.8 OH#, 0.2 acid# hexane diol adipate polyester polyol, and 192.99 parts 54.2 OH#, 0.64 acid# hexane diol phthalic anhydride polyester polyol were melted and added to a 500 ml reaction kettle. 80 parts of TPU-6 (of Example 13) was added to the reaction vessel and mixed under vacuum at 100° C.–135° C. 67.01 parts MDI (NCO/OH ratio of 2.4/1) was added and allowed to react under vacuum for 1 hour. The sample finished crystallizing after 1 hour when cooled to room temperature. The material had a viscosity of 30,100 cps at 250° F.. The peel resistance of the sample was measured. After hanging a 100 g weight 1 minute after cooling, it took'about 15 minutes for the sample to peel a distance of 20 mm. A DMA scan of the material as it set at 25° C. was carried out. After 100 seconds of cooling, it had a G' of $1.9 \times 10^{5th}$ dynes/cm$^2$, a G* of $3.2 \times 10^{5th}$ dynes/cm and a tan δ of about 1.4. After 3600 seconds of cooling the sample had a G' of $3.7 \times 10^{6th}$ dynes/cm$^2$, a G* of $5.0 \times 10^{6th}$ dynes/cm$^2$ and a tan δ of about 0.9.

EXAMPLE 15

Preparation of HMMC-9 with TPU-7 prepared in situ during synthesis of the adhesive.

146.45 parts of Terethane 2000 (59.1 OH# polytetramethylene ether diol available from Dupont) was melted and added to a 500 ml reaction kettle. 220 parts of Kristalex 3085 (non-reactive 85° C. ring & ball softening point, aromatic pure monomer based resin available from Hercules Incorporated) was add to the vessel, melted, and mixed under vacuum at 100° C.–135° C. for about 2 hours. 18.55 parts MDI (NCO/OH ratio of 0.96/1, theoretical OH# of 2, theoretical molecular weight of 56,000 g/mole) was added and allowed to react under vacuum for ~140 minutes at 115° C.–135° C. The batch was very thick at the end of this time period. 116.2 parts Acclaim 4200 (28.4 OH#, 0.012 acid# polypropylene oxide based diol available from Lyondell) and 13.2 parts Acclaim 6300 (27.5 OH# polypropyleneoxide based triol available from Lyondell) were added to the reaction vessel and mixed under vacuum at 115° C.–135° C. 35.6 parts MDI (NCO/OH ratio of 4/1) was added and allowed to react under vacuum for 1 hour. The material had a viscosity of 24,900 cps at 250° F. and had medium green strength when cooled.

EXAMPLE 16

Preparation of HMMC-10 with TPU-8 prepared in situ during synthesis of the adhesive.

56.07 parts of Terethane 2000 (59.1 OH# polytetramethylene ether diol available from Dupont) and 44 parts Dynacoll 7380 (30.5 OH#, 0.5 acid# crystalline polyester polyol available from CreaNova) were melted and added to a 500 ml reaction kettle. 220 parts of Kristalex 3085 (non-reactive 85° C. ring & ball softening point, aromatic pure monomer based resin available from Hercules Incorporated) was add to the vessel, melted, and mixed under vacuum at 100° C.–135° C. for about 2 hours. 9.93 parts MDI (NCO/OH ratio of 0.95/1, theoretical OH # of 2, theoretical molecular weight of 56,000 g/mole) was added and allowed to react under vacuum for ~150 minutes at 115° C.–135° C. The batch was very thick at the end of this time period. 116.36 parts Arcol R-2728 (28.2 OH#, 0.015 acid# polypropylene oxide based diol available from Lyondell) and 18.15 parts Acclaim 6300 (27.5OH# polypropylene oxide based triol available from Lyondell) were added to the reaction vessel and mixed under vacuum at 115° C.–135° C. 39.94 parts MDI (NCO/OH ratio of 3.4/1) was added and allowed to react under vacuum for ~30 minutes. 0.55 parts Jeffcatt DMDEE (tertiary amine catalyst available from Huntsman) was added and the material was mixed under vacuum for another 15 minutes.

The material had a viscosity of 21,950 cps at 250° F. and became opaque 15–30 minutes after cooling indicating that the polyester had crystallized over this time period.

EXAMPLE 17

Preparation of HMMC-11 with TPU-9 prepared in situ during synthesis of the adhesive.

133.69 parts of 56.61 OH#, 0.39 acid # hexane diol phthalic anhydride polyester polyol was melted and added to a 500 ml reaction kettle and mixed under vacuum at 100° C.–135° C. for about 2 hours. 16.31 parts MDI (NCO/OH ratio of 0.96/1, theoretical OH # of 2, theoretical molecular weight of 56,000 g/mole) was added and allowed to react under vacuum for ~1.5 hour at 120° C.–180° C. 345.25 parts 56.61 OH#, 0.39 acid# hexane diol phthalic anhydride polyester polyol was melted and added to the reaction vessel along with 0.06 parts Uvitex OB and mixed under vacuum at 100° C.–150° C. 104.69 parts MDI (NCO/OH ratio of 2.35/1) was added and allowed to react under vacuum for 1 hour. The material had a viscosity of ~11,000 cps at 250° F. A DMA scan of the material as it set at 25° C. was carried out. After 100 seconds of cooling, it had a G' of $6.6\times10^{5th}$ dynes/cm$^2$, a G* of $1.3\times10^{6th}$ dynes/cm$^2$ and a tan δ of about 1.7. After 2000 seconds of cooling it had a G' of $1.3\times10^{6th}$ dynes/cm$^2$, a G* of $2.3\times10^{6th}$ dyne and a tan δ of about 1.5. A DMA scan of the molten material was also measured at 200° F. At a measurement frequency of 10 radians/second the material had a G" of $4.5\times10^{4th}$ dynes/cm$^2$ and a of $6\times10^{3rd}$ dynes/cm$^2$. The material was applied by slot die to a porous polyamide fabric and bonded to a treated polyolefin film. The material exhibited no roll up onto the die when coated at 190° F.–230° F. with a coverage of ~1.5–5 g/m$^2$ and after cure the material exhibited good adhesion.

EXAMPLE 18

Preparation of HMMC-12 with TPU-10 prepared in situ during synthesis of the adhesive.

106.74 parts of 56.61 OH#, 0.39 acid # hexane diol phthalic anhydride polyester polyol and 5.0 parts of 22.8 OH#, 0.2 acid # hexane diol adipic acid polyester polyol were melted and added to a 500 ml reaction kettle and mixed under vacuum at 100° C.–135° C. for about 2 hours. 13.26 parts MDI (NCO/OH ratio of 0.96/1, theoretical OH # of 2, theoretical molecular weight of 56,000 g/mole) was added and allowed to react under vacuum for ~1.5 hour at 120° C.–180° C. 42.11 parts 56.61 OH#, 0.39 acid# hexane diol phthalic anhydride polyester polyol, 20.0 parts of 22.8 OH#, 0.2 acid # hexane diol adipic acid polyester polyol, 100.0 parts of 100 OH#; 1.11 acid # neopentyl glycol phthalic anhydride polyester polyol, and 50 parts Dynacoll X-7371 (30 OH#, 0.5 acid# crystalline polyester polyol available from CreaNova) were melted and added to the reaction vessel along with 60 parts Poly G 55-56 (56 OH# ethylene oxide capped polypropylene oxide polyether polyol available from Arch Chemical), 5 parts Mistron Vapor Talc, 1.10 parts 2,2'-dimorphlinodiethylether, and 0.05 parts Uvitex OB and mixed under vacuum at 100° C.–150° C. 96.74 parts MDI (NCO/OH ratio of 2.4/1) was added and allowed to react under vacuum for 1 hour. The material had a viscosity of 7,300 cps at 250° F. A DMA scan of the material as it set at 25° C. was carried out. After 100 seconds of cooling, it had a G' of $5.0\times10^{4th}$ dynes/cm$^2$, a G* of $1.5\times10^{5th}$ dynes/cm$^2$ and a tan δ of about 2.8. After 2000 seconds of cooling it had a G' of $5.2\times10^{6th}$ dynes/cm$^2$,a G* of $6.3\times10^{6th}$ dynes/cm$^2$ and a tan δ of about 0.7. A DMA scan of the molten material was also measured at 200° F. At a measurement frequency of 10 radians/second the material had a G" of ~$1.5\times10^{4th}$ dynes/cm$^2$and a C' of $3\times10^{3rd}$ dynes/cm$^2$. The material was applied by slot die to a porous polyamide fabric and bonded to a treated polyolefin film. The material exhibited no roll up onto the die when coated at 220° F. with a coverage of ~5 g/m and after cure the material exhibited good adhesion.

EXAMPLE 19

Preparation of HMMC-13 with TPU-11 prepared in situ during synthesis of the adhesive.

122.55 parts of 56.61 OH#, 0.39 acid # hexane diol phthalic anhydride polyester polyol was melted and added to a 500 ml reaction kettle and mixed under vacuum at 100° C.–135° C. for about 2 hours. 14.95 parts MDI (NCO/OH ratio of 0.96/1, theoretical OH # of 2, theoretical molecular weight of 56,000 g/mole) was added and allowed to react under vacuum for ~1.5 hour at 120° C.–180° C. 243.96 parts 56.61 OH#, 0.39 acid# hexane diol phthalic anhydride polyester polyol 82.5 parts of 22.8 OH#, 0.2 acid # hexane diol adipic acid polyester polyol and were melted and added to the reaction vessel along with 0.06 parts Uvitex OB and mixed under vacuum at 100° C.–150° C. 85.96 parts MDI (NCO/OH ratio of 2.4/1) was added and allowed to react under vacuum for 1 hour. The material had a viscosity of 12,500 cps at 250° F. A DMA scan of the material as it set at 25° C. was carried out. After 100 seconds of cooling, it had a G' of $1.2\times10^{5th}$ dynes/cm$^2$, a G* of $3.4\times10^{5th}$ dynes/cm and a tan δ of about 2.6. After 2000 seconds of cooling it had a G' of $4.0\times10^{5th}$ dynes/cm$^2$, a G* of $5.7\times10^{5th}$ dynes/cm$^2$ and a tan δ of about 1. A DMA scan of the molten material was, also measured at 200° F. At a measurement frequency of 10 radians/second the material had a G" of $6\times10^{3rd}$ dynes/cm$^2$ and a G' of $1\times10^{2nd}$ dynes/cm . The material was applied by slot die to a porous polyamide fabric and bonded to a treated polyolefin film. The material exhibited a slight roll up onto the die when coated at 190° F.–230° F. with a coverage of ~5 g/m$^2$.

EXAMPLE 20

Preparation of TPU-12

358.03 parts of 54.2 OH#, 0.64 acid # hexane diol phthalic anhydride polyester polyol was melted and added to a 500 ml reaction kettle and mixed under vacuum at 100° C.–135° C. for about 2 hours. 41.97 parts MDI (NCO/OH ratio of 0.96/1, theoretical OH # of 2, theoretical molecular weight of 56,000 g/mole) was added and allowed to react under vacuum for 1 hour at 120° C.–150° C. The sample was discharged and cooled.

EXAMPLE 21

Preparation of HMMC-14 with TPU-12

617 parts 54.2 OH#, 0.64 acid# hexane diol phthalic anhydride polyester polyol was melted and added to a 500 ml reaction kettle. 200 parts of TPU-12 was added to the reaction vessel and mixed under vacuum at 100° C.–135° C. 183 parts MDI (NCO/OH ratio of 2.4/1) was added and allowed to react under vacuum for 1 hour. The material had a viscosity of 17,800 cps at 250° F. The peel resistance of the sample was measured. After hanging a 100 g weight 30 seconds after cooling, it took about 7 minutes for the sample to peel a distance of 20 mm. A DMA scan of the material as it set at 25° C. was carried out. After 100 seconds of cooling, it had a G' of $2.8 \times 10^{5th}$ dynes/cm$^2$, a G* of $5.0 \times 10^{5th}$ dynes/cm$^2$ and a tan δ of about 1.5. After 2000 seconds of cooling the sample had a G' of $4.6 \times 10^{5th}$ dynes/cm$^2$ an G* of $8.0 \times 10^{6th}$ dynes/cm$^2$ and a tan δ of about 1.4. The 1 kg PAFT of the material was 333° F.

EXAMPLE 22

Preparation of HMMC-15 with TPU-13 prepared in situ during synthesis of the adhesive.

111.4 parts of 56.61 OH#, 0.39 acid # hexane diol phthalic anhydride polyester polyol was melted and added to a reaction vessel and mixed under vacuum at 100° C.–135° C. for about 2 hours. 13.59 parts MDI (NCO/OH ratio of 0.96/1, theoretical OH # of 2, theoretical molecular weight of 56,000 g/mole) and 40.4 parts Synthetic Resin AP (acetophenone/formaldehyde resin, 76° C.–82° C. softening range, available from CreaNova) were added to the reaction vessel. The MDI was allowed to react under vacuum for 1 hour at 120° C.–180° C. 62.4 parts 56.61 OH#, 0.39 acid# hexane diol phthalic anhydride polyester polyol, 25.0 parts of 22.8 OH#, 0.2 acid # hexane diol adipic acid polyester polyol, 50.0 parts of 100 OH#, 1.11 acid # neopentyl glycol phthalic anhydride polyester polyol, and 50 parts Dynacoll X-7371 (30 OH#, 0.5 acid# crystalline polyester polyol available from CreaNova) were melted and added to the reaction vessel along with 60 parts Poly G 55-56 (56 OH# ethylene oxide capped polypropylene oxide polyether polyol available from Arch Chemical) and 9.6 parts Synthetic Resin AP and mixed under vacuum at 100° C.–150° C. 76.5 parts MDI (NCO/OH ratio of 2.4/1) was added and allowed to react under vacuum for 1 hour. 1.1 parts 2,2'-dimorphlinodiethylether was added and mixed for about ½ hour. The material had a viscosity of 10,900 cps at 250° F. A DMA scan of the material as it set at 25° C. was carried out. After 100 seconds of cooling, it had a G' of $4.5 \times 10^{4th}$ dynes/cm$^2$, a G* of $1.0 \times 10^{5th}$ dynes/cm$^2$, and a tan δ of about 2.0. After 2000 seconds of cooling it had a of $9.5 \times 10^{6th}$ dynes/cm$^2$, a G* of $1.0 \times 10^{7th}$ dynes/cm$^2$ and a tan δ of about 0.33. The 1 kg PAFT of the material was 294° F.

Comparative Example A illustrates the importance of allowing adequate polymerization time and temperature for the development of TPU molecular weight during in situ preparation of TPU component. In comparison to Example 15, Comparative Example A exhibited about $\frac{1}{10}^{th}$ of the viscosity and had lower green strength. A reaction time of 105 minutes at a temperature of 105±5° C. for the TPU is not long enough, nor hot enough to obtain the desired high molecular weight in comparison to the TPU reaction time of 140 minutes at 125±10° C. of Example 15.

Comparative Example A—Preparation of polyether based TPU without hard segments in situ but with inadequate time and temperature for high molecular weight TPU development during reactive hot melt synthesis. 147.28 parts of Terethane 2000 (56.25 OH# polytetramethylene ether diol available from Dupont) was melted and added to a 500 ml reaction kettle. 220 parts of Kristalex 3085 (non-reactive 85° C. ring & ball softening point, aromatic pure monomer based resin available from Hercules Incorporated) was add to the vessel, melted, and mixed under vacuum at 100° C.–135° C. for about 2 hours. 17.72 parts MDI (NCO/OH ratio of 0.96/1, theoretical OH # of 2, theoretical molecular weight of 56,000 g/mole) was added and allowed to react under vacuum for 105 minutes at 100° C.–110° C. 116.2 parts Acclaim 4200 (28.4 OH#, 0.012 acid# polypropylene oxide based diol available from Lyondell) and 13.2 parts Acclaim 6300 (27.5 OH# polypropylene oxide based triol available from Lyondell) were added to the reaction vessel and mixed under vacuum at 100° C.–110° C. 35.6 parts MDI (NCO/OH ratio of 4/1) was added and allowed to react under vacuum for 1 hour at 100° C.–110° C. The material had a viscosity of 2,825 cps at 250° F. and had low green strength when cooled.

Comparative Examples B–E demonstrate the importance of employing a TPU without hard segments. In each of these examples a commercially available TPU having hard segments was used. In the case of Comparative Example B, the viscosity was low. However, the peel resistance was poor. On the otherhand, Comparative Examples C & D exhibited high green strength, as it relates to peel resistance. However, the high green strength was accompanied by high molten viscosity. In the case of Comparative Example E, the reactants were chosen such that the composition would have about the same stiffness, G*, as Example 18. However, the green strength as measured by G', was relatively low in comparison to Example 18.

Comparative Example B—85.5 parts Voranol 222-029 (29 OH# ethylene oxide capped polypropylene oxide polyether polyol available from Dow Chemical) and 0.09 parts 85% phosphoric acid were added to a 500 ml reaction kettle. 75 parts 110 OH#, 1.5 acid# neopentyl glycol phthalic anhydride polyester polyol was melted and added to the reaction vessel and 90 parts Pearlbond 501 was added to the reaction vessel and mixed under vacuum at 100° C.–135° C. 49.41 parts MDI (NCO/OH ratio of 2/1) was added and allowed to react under vacuum for 1 hour. The material had a viscosity of 17,400 cps at 250° F. The peel resistance of the sample was measured. After hanging a 100 g weight 1 minute after cooling, it took about 0.5 minutes for the sample to peel a distance of 20 mm. A DMA scan of the material as it set at 25° C. was carried out. After 100 seconds of cooling, it had a G' of $3.4 \times 10^{4th}$ dynes/cm , a G* of $7.5 \times 10^{4th}$ dynes/cm$^2$ and a tan δ of about 2. After 2000 seconds of cooling it had a G' of $1.3 \times 10^{5th}$ dynes/cm$^2$, a G* of $2.2 \times 10^{5th}$ dynes/cm and a tan δ of about 1.4. A DMA scan of the molten material was also measured at 10 radians/second. The material had a G" of $4.5 \times 10^{4th}$ dyne and a of $6 \times 10^{3rd}$ dynes/cm$^2$. The material was applied by slot die to a porous polyamide fabric and bonded to a treated polyolefin film. The material exhibited roll up onto the die when coated at 220° F. with a coverage of about 5 g/m$^2$.

Comparative Examples C and D—Following the general procedure described for Comparative Example B, 85.5 parts Voranol 222-029 (29 OH# ethylene oxide capped polypropylene oxide polyether polyol available from Dow Chemical) and 0.09 parts 85% phosphoric acid were added to a 500 ml reaction kettle. 75 parts 110 OH#, 1.5 acid# neopentyl glycol phthalic anhydride polyester polyol was melted and added to the reaction vessel and 90 parts TPU was added to the reaction vessel and mixed under vacuum at 100° C.–175° C. For Example C, Estane 5714F5* was employed as the TPU, whereas for Example D Pellethane 2103-70A was employed. 49.41 parts MDI (NCO/OH ratio of 2/1) was added and allowed to react under vacuum for 1 hour. The viscosity at 250° F. and the peel resistance of the samples were measured. Both Examples C and D exhibited high peel resistance values of >9 minutes and about 4.5 minutes, respectively. However, when employing a conventional TPU with hard segements, the high green strength was accompanied by a high molten viscosity's. The viscosity of Example C was about 100,000 cps at 325° F. and a gel at 250° F. Example D was also a gel at 250° F. with a viscosity of 42,500 cps at 325° F. *Estane 5714F5 —Polyether based TPU—(Vicat Softening Point, ASTM D-1525, of 71° C., Melt viscosity, ASTM D-1084-88, 204° C., of 72,000 cps, Shore hardness, ASTM D-2240, of 80A. Available from B. F. Goodrich Specialty Chemicals) **Pellethane 2103-80PF—Polyether based TPU—(Vicat Softening Temp., ASTM D1525, of 68.9° C., Melt Index, ASTM D-1238, 190° C./8700 g, of 39 g/10 minutes, Shore hardness, ASTM D-2240, of 84A. Available from Dow Chemical Company)

Comparative Example E—143.85 parts Dynacoll 7210 (30 OH# polyester polyol available from CreaNova) and 45 parts 22.8 OH4, 0.2 acid# hexane diol adipate were melted and added to a 500 ml reaction kettle. 0.15 parts Irganox 1010 antioxidant, 45 20 parts Synthetic Resin AP (acetophenone/formaldehyde resin, 76° C.—82° C. softening range, available from CreaNova), and 30 parts Pearlbond 501 (Polyester based TPU. Melt flow index (170° C., 2.16 kg/6 min.) of 30–50. Viscosity of ~148,000 mPa.s at 190° C. Softening point of 61° C.–65° C. Available from Merquinsa) were added to the reaction vessel and mixed under vacuum at 100° C.–135° C. 36 parts MDI (NCO/OH ratio of 2.8/1) was added and allowed to react under vacuum for 1 hour. The material had a viscosity of 11,350 cps at 250° F. The static peel resistance of the sample was measured. After hanging a 100 g weight 1 minute after cooling, it took about 0.8 minutes for the sample to peel a distance of 20 mm. A DMA scan of the material as it set at 25° C. was carried out. After 100 seconds of cooling, it had a G' of $3.4 \times 10^{4th}$ dynes/cm$^2$, a G* of $1.4 \times 10^{5th}$ dynes/cm$^2$. After 2000 seconds of cooling, it had a G' of $5.1 \times 10^{5th}$ dynes/cm$^2$, a G* of $1.1 \times 10^{6th}$ dynes/cm$^2$, and a tan delta of about 1.9.

Comparative Example F, G and H illustrate typical low viscosity hot melt moisture cure compositions prepared from typical polyols having a molecular weight form about 1000–6000 g/mole. Comparative Examples F and G had a similar viscosity and stiffness, as measured by G*, as Example 7. However, the comparative examples lacking high molecular weight TPU, exhibited a substantially lower green strength as measured by peel resistance and G'. Comparative Example H has similar viscosity and green strength as measured by peel resistance as Example 7. However, the composition was about twice as stiff, as measured by G*, resulting in reduced wet out and adhesion.

Comparative Example F—111.17 parts Dynacoll 7250 (21 OH#, 1 acid# amorphous polyester polyol available from CreaNova) and 369.07 parts 56.61 OH#, 0.39 acid# hexane diol phthalic anhydride polyester polyol were melted, added to a 500 ml reaction kettle, and mixed under vacuum at 90° C.–110° C. 75.59 parts MDI (NCO/OH ratio of 1.44/1) was added and allowed to react under vacuum for 1 hour. The material had a viscosity of 8,150 cps at 250° F. The peel resistance of the sample was measured. After hanging a 20 g weight 30 seconds after cooling, it took about 0.8 minutes for the sample to peel a distance of 20 mm. Between 10 and 60 minutes after hanging the 20 g weight, the sample peeled a distance of about 64 mm. After hanging a 10 g weight 30 seconds after cooling, it took about 22 minutes for the sample to peel a distance of 20 mm. Between 10 and 60 minutes after hanging the 10 g weight, the sample peeled a distance of about 38 mm. A DMA scan of the material as it set at 25° C. was carried out. After 100 seconds of cooling, it had a G' of $7.8 \times 10^{4th}$ dynes/cm$^2$, a G* of $3.6 \times 10^{5th}$ dynes/cm$^2$ and a tan δ of about 4.5. After 2000 seconds of cooling the sample had a G' of $1.7 \times 10^{5th}$ dynes/cm$^2$, a G* of $6.0 \times 10^{6th}$ dynes/cm$^2$ and a tan δ of about 3.3. A DMA scan of the molten material was also measured at 200° F. At a measurement frequency of 10 radians/second the material had a G" of $2.5 \times 10^{4th}$ dynes/cm$^2$ and a G' of $3.5 \times 10^{2nd}$ dynes/cm$^2$. The material was applied by slot die to a porous polyamide fabric and bonded to a treated polyolefin film. The material exhibited roll up onto the die when coated at 180° F.–220° F. with a coverage of ~5 g/m$^2$.

Comparative Example G—Use of two staged reaction to make low molecular weight, 4000 g/mole, TPU without hard segments in reactive hot melt formula. 82.5 parts Poly G 22-37 (35.3 OH#, 0.004 acid # ethylene oxide capped polypropylene oxide polyether polyol available from Arch Chemical) was added to a 500 ml reaction kettle. 380.6 parts 56.61 OH#, 0.39 acid# hexane diol phthalic anhydride polyester polyol was melted and added to the reaction vessel and mixed under vacuum at 100° C.–135° C. 25.85 parts MDI (NCO/OH ratio of 0.47/1, theoretical OH # of 26.6, theoretical molecular weight of 4,200 g/mole) was added and allowed to react under vacuum for ~90 minutes at 110° C.–130° C. The sample was then cooled to ~80° C. and 61.05 parts MDI (NCO/OH ratio of 2.1/1) was added and allowed to react under vacuum for 1 hour. The material had a viscosity of 9,550 cps at 250° F. The peel resistance of the sample was measured. After hanging a 50 g weight 30 seconds after cooling, it took about 0.9 minutes for the sample to peel a distance of 20 mm. After hanging a 20 g weight 30 seconds after cooling, it took about 13.5 minutes for the sample to peel a distance of 20 mm. Between 10 and 60 minutes after hanging the 20 g weight, the sample peeled a distance of about 95 mm. After hanging a 10 g weight 30 seconds after cooling, it took about 16 minutes for the sample to peel a distance of 20 mm. Between 10 and 60 minutes after hanging the 10 g weight, the sample peeled a distance of about 59 mm. A DMA scan of the material as it set at 25° C. was carried out. After 100 seconds of cooling, it had a G' of $5.9 \times 10^{4th}$ dynes/cm$^2$, a G* of $3 \times 10^{5th}$ dynes/cm$^2$ and a tan δ of about 5. After 2000 seconds of cooling it had a of $1.8 \times 10^{5th}$ dynes/cm$^2$, a G* of $6 \times 10^{5th}$ dynes/cm$^2$ and a tan δ of about 3.1. Compared to example 7, this example had similar viscosity and stiffness as measured by G*, but lower green strength as measured by peel resistance. The material was applied by slot die to a porous polyamide fabric and bonded to a treated polyolefin film. The material exhibited roll up onto the die when coated at 180° F.–220° F. with a coverage of ~5 g/m$^2$.

Comparative Example H—55.58 parts Poly G 22-37 (35.3 OH#, 0.004 acid # ethylene oxide capped polypropylene oxide polyether polyol available from Arch Chemical) was added to a 500 ml reaction kettle. 411.31 parts 56.61 OH#, 0.39 acid# hexane diol phthalic anhydride polyester polyol was melted and added to the reaction vessel and mixed under vacuum at 100° C.–135° C. 88.93 parts MDI (NCO/OH ratio of 1.57/1) was added and allowed to react under vacuum for 1 hour. The material had a viscosity of 7,200 cps at 250° F. The peel resistance of the sample was measured. After hanging a 20 g weight 30 seconds after cooling, it took about 14 minutes for the sample to peel a distance of 20 mm. Between 10 and 60 minutes after hanging the 20 g weight, the sample peeled a distance of about 38 mm., After hanging a 10 g weight 30 seconds after cooling, it took about 36 minutes for the sample to peel a distance of 20 mm. Between 10 and 60 minutes after hanging the 10 g weight, the sample peeled a distance of about 18 mm. A DMA scan of the material as it set at 25° C. was carried out. After 100 seconds of cooling, it had a G' of $1.5 \times 10^{5th}$ dynes/cm$^2$, a G* of $6 \times 10^{5th}$ dynes/cm$^2$ and a tan δ of about 4. After 2000 seconds of cooling the sample had a G' of $3.2 \times 10^{5th}$ dynes/cm$^2$, a G* of $1.0 \times 10^{6th}$ dynes/cm$^2$ and a tan δ of about 3.

What is claimed is:

1. A hot melt moisture cure composition comprising a composition prepared from:
   a) at least one polyol;
   b) at least one isocyanate present at a sufficient concentration to impart moisture curing; and
   c) at least one thermoplastic polyurethane that is substantially free of hard segments and having a number average molecular weight greater than 10,000 g/mole, wherein said composition has a viscosity of less than 60,000 cps at 250° F., a complex modulus of less than $1 \times 10^7$ dynes/cm$^2$ after about 100 seconds of cooling, and a peel adhesion failure temperature of greater than about 250° F.

2. A hot melt moisture cure polyurethane prepolymer composition comprising a composition prepared from:
   a) at least one polyol;
   b) at least one thermoplastic polyurethane that is substantially free of hard segments and having a number average molecular weight of greater than about 10,000 g/mole; and
   c) at least one isocyanate present at a sufficient concentration to impart moisture curing.

3. The hot melt moisture cure prepolymer of claim 2 wherein said composition is substantially solid, having a viscosity of at least about $1 \times 10^6$ centipoise at 25° C.

4. The hot melt moisture cure prepolymer of claim 2 wherein the viscosity of the composition is less than 100,000 at 400° F.

5. The hot melt moisture cure prepolymer of claim 2 wherein the polyol has a molecular weight (Mn) of less than about 5000 g/mole.

6. The composition of claim 1, having a viscosity of less than 30,000 cps at 250° F.

7. The composition of claim 1, having a viscosity of less than 15,000 cps at 250° F.

8. The composition of claim 1 wherein said composition exhibits a storage modulus greater than about $1 \times 10^4$ dynes/cm$^2$.

9. The composition of claim 1, wherein said composition exhibits a storage modulus greater than about $5 \times 10^4$ dynes/cm$^2$.

10. The composition of claim 1, wherein said peel adhesion failure is greater than 270° F.

11. The composition of claim 1, wherein said peel adhesion failure is greater than 290° F.

12. A method of preparing a hot melt moisture cure adhesive composition comprising:
   a) adding at least one fit polyol ingredient and at least one first isocyanate ingredient to a reaction vessel;
   b) polymering said at least one first polyol ingredient and said at least one isocyanate ingredient to form an OH or NCO terminated thermoplastic polyurethane ingredient having a number average molecular weight of at least about 10,000 g/mole, wherein ad thermoplastic polyurethane is substantially free of hard segments;
   c) adding at least one second polyol ingredient and at least one second isocyanate ingredient; and
   d) polymerizing said at least one second polyol ingredient and said at least one second isocyanate ingredient to form a hot melt moisture cure adhesive composition.

13. The method of claim 9 wherein the polyol of step "a" is the same as the polyol of step "c".

14. An article comprising a permeable or porous substrate bonded to a second substrate through the hot melt moisture cure adhesive composition of claim 1.

15. The article of claim 1 where said composition has a viscosity of less than 30,000 cps at 250° F.

16. The article of claim 1 where said composition has a viscosity of less than 15,000 cps at 250° F.

17. A hot melt moisture cure composition comprising:
   a) at least one polyol;
   b) at least one isocyanate present at a sufficient concentration to impart moisture curing; and
   c) at least one thermoplastic polyurethane that is substantially free of hard segments and having a number average molecular weight greater than 10,000 g/mole, wherein said composition has a viscosity of less than 60,000 cps at 250° F., a complex modulus of less than $1 \times 10^7$ dynes/cm$^2$ after about 100 seconds of cooling, and a peel adhesion failure temperature of greater than about 250° F.

18. A hot melt moisture cure polyureathane prepolymer composition comprising:
   a) at least one polyol;
   b) at least one thermoplastic polyurethane that is substantially free of hard segments and having a number average molecular weight of greater than about 10,000 g/mole; and
   c) at least one isocyanate present at a sufficient concentration to impart moisture curing.

19. The article of claim 1 wherein the storage modulus of said adhesive composition is at least about 25% higher than an adhesive composition having about the same viscosity and complex modulus.

20. The article of claim 1 wherein the peel adhesion failure temperature is greater than 270° F.

21. The article of claim 1 wherein the peel adhesion failure temperature is greater than 290° F.

22. The article of claim 1 wherein the adhesive composition exhibits a peel resistance of at least 1 minute for a 100 g weight.

23. The article of claim 1 wherein at least one of said first and second substrates is selected from the group consisting of a textile material, fabric, and nonwoven.

24. The article of claim 23 wherein the adhesive composition is amorphous.

25. A method of bonding a substrate comprising:
   a) providing a first substrate;
   b) applying a molten hot melt moisture cure composition to said first substrate, said hot melt moisture cure composition comprising the composition of claim 1; and
   c) contacting said adhesive composition with a second substrate such that said first substrate is bonded to said second substrate through said adhesive composition.

26. The method of claim 25 wherein said adhesive is applied with an application method selected from the group consisting of gravure roll coating, engraved roll coating, and porous coating.

27. The method of claim 25 wherein the application temperature of said molten hot melt moisture cure adhesive from about 200° F. to about 300° F.

28. The method of claim 25 wherein said applying comprises porous coating and is substantially free of adhesive roll up.

* * * * *

UNITED STATES PATENT AND TRADEMARK OFFICE
CERTIFICATE OF CORRECTION

PATENT NO.    : 6,660,376 B1
DATED         : December 9, 2003
INVENTOR(S)   : John M. Zimmel, William L. Bunnelle, Brendon J. Kryzer It is certified that error appears in the above-identified patent and that said Letters Patent is hereby corrected as shown below:

Column 23,
Line 55, "failure is" should read -- failure temperature is --.
Line 57, "failure is" should read -- faliure temperature is --.
Line 60, "one fit polyol" should read -- one first polyol --.
Line 66, "wherein ad thermoplastic" should read -- wherein said thermoplastic --.

Column 24,
Line 4, "the method of claim 9" should read -- wherein said thermoplastic --.
Line 9 and 11, "article of claim 1" should read -- article of claim 14 --.
Line 13, delete "17. A hot melt..." to and including "about $250^0$ F." and insert -- 17. The article of claim 14 wherein the storage modulus of the adhesive composition is greater than about $1 \times 10^4$ dynes/cm$^2$. --.
Line 25, delete "18. A hot melt" to and including "moisture curing." and isert -- 18. The article of claim 14 wherein the storage modulus fo the adhesive composition is greater than about $5 \times 10^4$ dynes/cm$^2$. --.
Line 34, 38, 40, 42 and 45, "article of claim 1" should read -- article of claim 14 --.
Line 64, "moisture cure adhesive' should read -- moisture cure adhesive composition ranges --.

Signed and Sealed this

Sixth Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,660,376 B1
DATED : December 9, 2003
INVENTOR(S) : John M. Zimmel, William L. Bunnelle, Brendon J. Kryzer It is certified that error appears in the above-identified patent and that said Letters Patent is hereby corrected as shown below:

Column 23,
Line 55, "failure is" should read -- failure temperature is --.
Line 57, "failure is" should read -- failure temperature is --.
Line 60, "one fit polyol" should read -- one first polyol --.
Line 66, "wherein ad thermoplastic" should read -- wherein said thermoplastic --.

Column 24,
Line 4, "wherein said thermoplastic" should read -- the method of claim 12 --.
Line 9 and 11, "article of claim 1" should read -- article of claim 14 --.
Line 13, delete "17. A hot melt…" to and including "about $250^0$ F." and insert -- 17. The article of claim 14 wherein the storage modulus of the adhesive composition is greater than about $1 \times 10^4$ dynes/cm$^2$. --.
Line 25, delete "18. A hot melt" to and including "moisture curing." and insert -- 18. The article of claim 14 wherein the storage modulus of the adhesive composition is greater than about $5 \times 10^4$ dynes/cm$^2$. --.
Line 34, 38, 40, 42 and 45, "article of claim 1" should read -- article of claim 14 --.
Line 64, "moisture cure adhesives" should read -- moisture cure adhesive composition ranges --.

This certificate supersedes Certificate of Correction issued July 6, 2004.

Signed and Sealed this

Twenty-eighth Day of September, 2004

JON W. DUDAS
*Director of the United States Patent and Trademark Office*